J. P. COLEMAN.
RAILWAY TRAFFIC CONTROLLING APPARATUS.
APPLICATION FILED JUNE 5, 1913. RENEWED APR. 6, 1916.

1,202,164.

Patented Oct. 24, 1916.
5 SHEETS—SHEET 4.

WITNESSES

INVENTOR

J. P. COLEMAN.
RAILWAY TRAFFIC CONTROLLING APPARATUS.
APPLICATION FILED JUNE 5, 1913. RENEWED APR. 6, 1916.

1,202,164.

Patented Oct. 24, 1916.
5 SHEETS—SHEET 5.

WITNESSES

INVENTOR

UNITED STATES PATENT OFFICE.

JOHN P. COLEMAN, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

1,202,164.            Specification of Letters Patent.      Patented Oct. 24, 1916.

Application filed June 5, 1913, Serial No. 771,817. Renewed April 6, 1916. Serial No. 89,489.

*To all whom it may concern:*

Be it known that I, JOHN P. COLEMAN, a citizen of the United States, residing at Edgewood Borough, in the county of Allegheny and State of Pennsylvania, have invented certain new and useful Improvements in Railway-Traffic-Controlling Apparatus, of which the following is a specification.

My invention relates to railway traffic controlling apparatus, and particularly to apparatus of this type which is operated by fluid pressure.

I will describe one form of apparatus embodying my invention, and will then point out the novel features thereof in claims.

Figure 1:
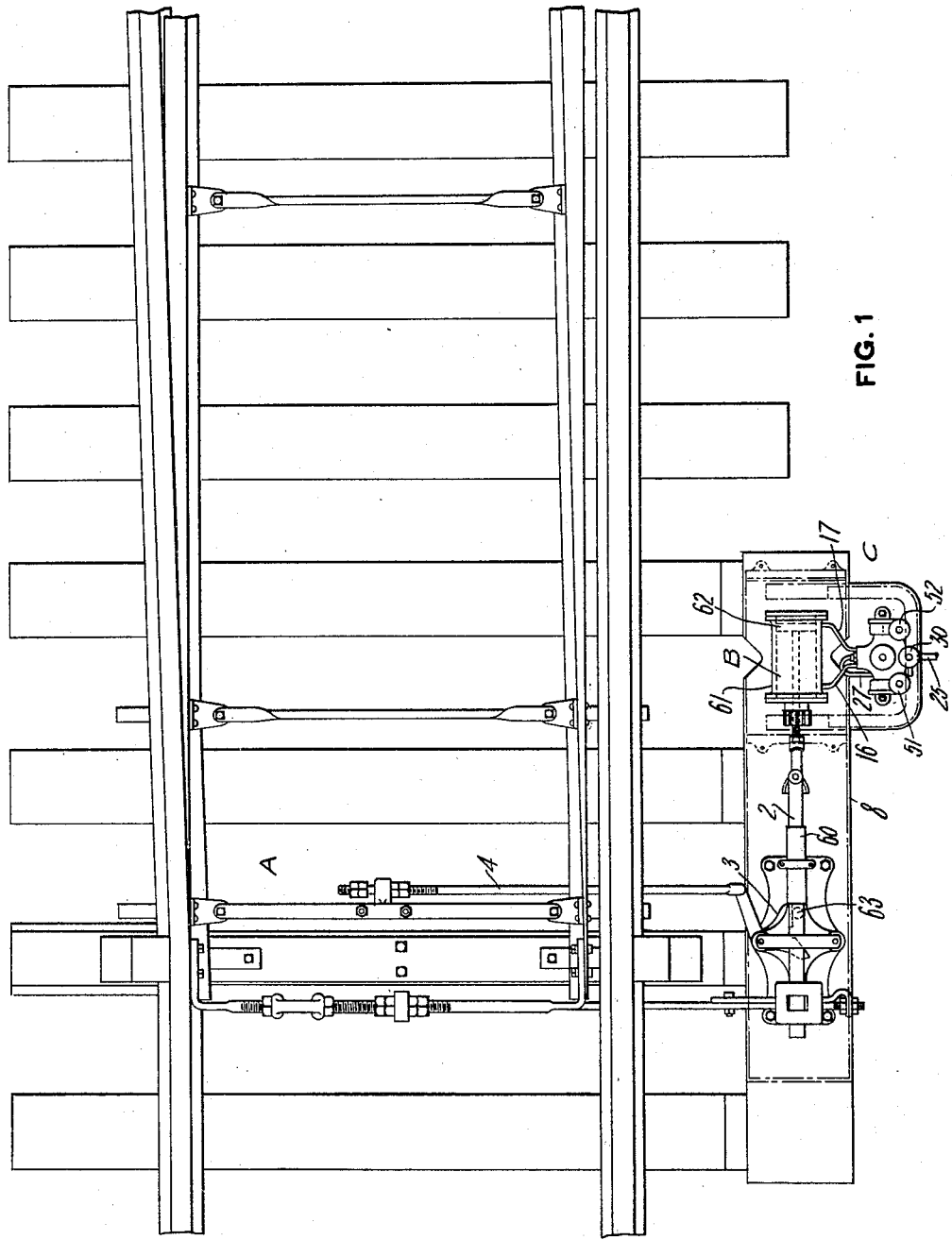
Figure 2:
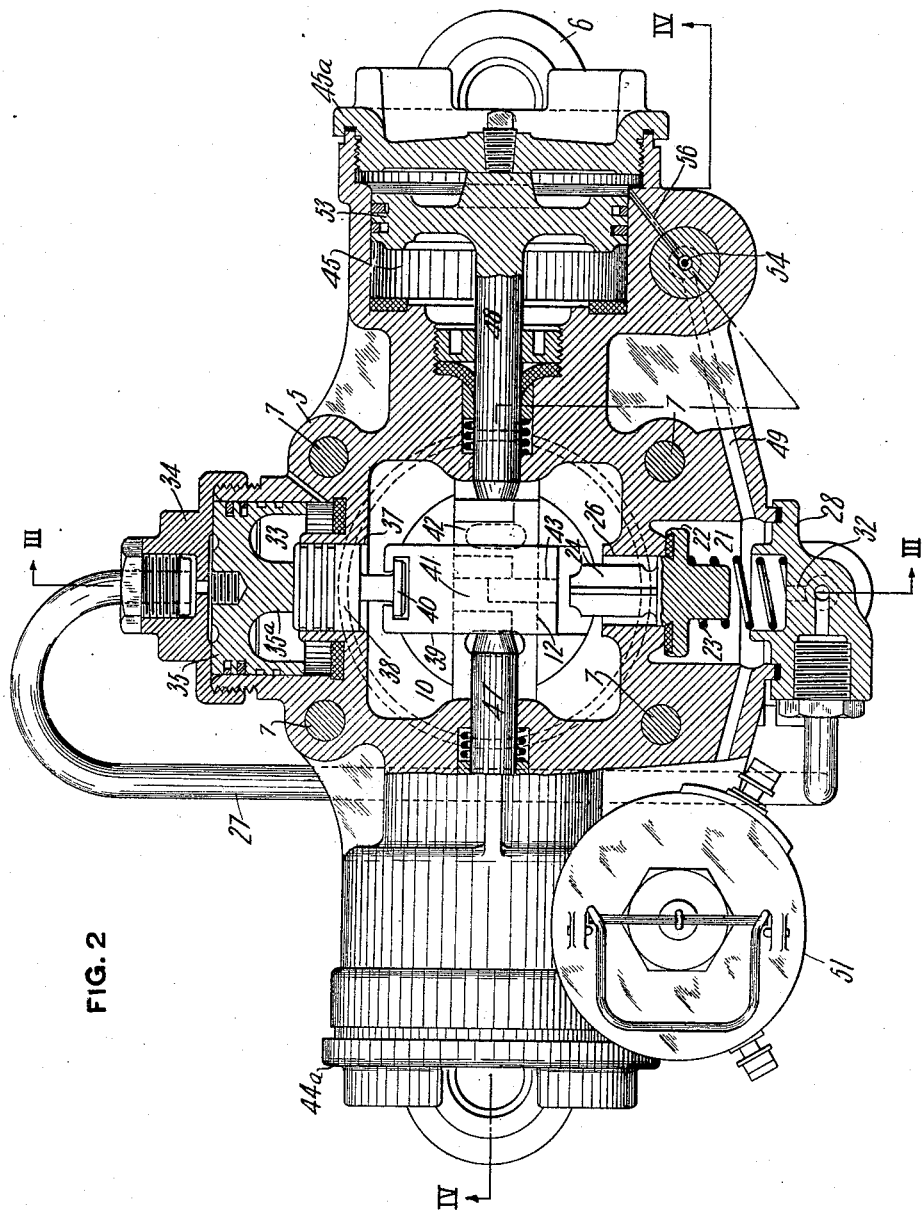
Figure 3:
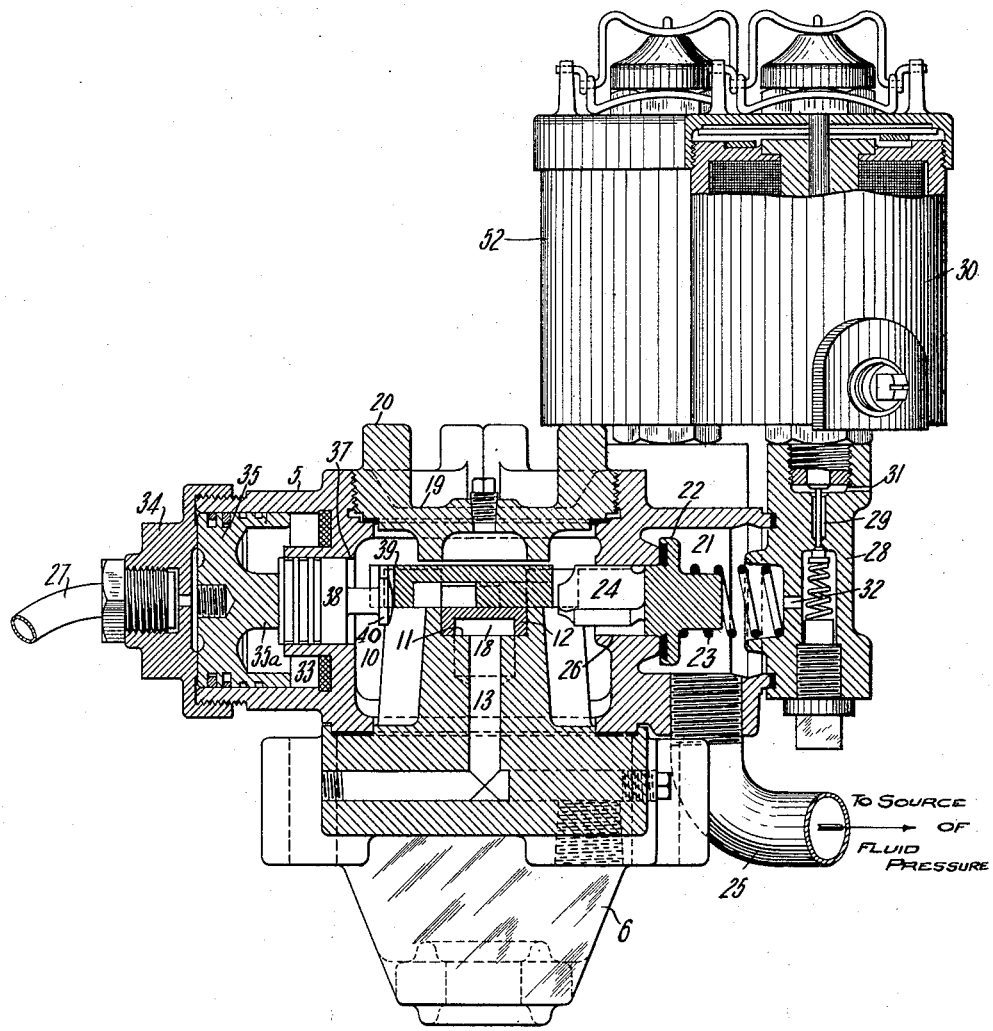
Figure 4:
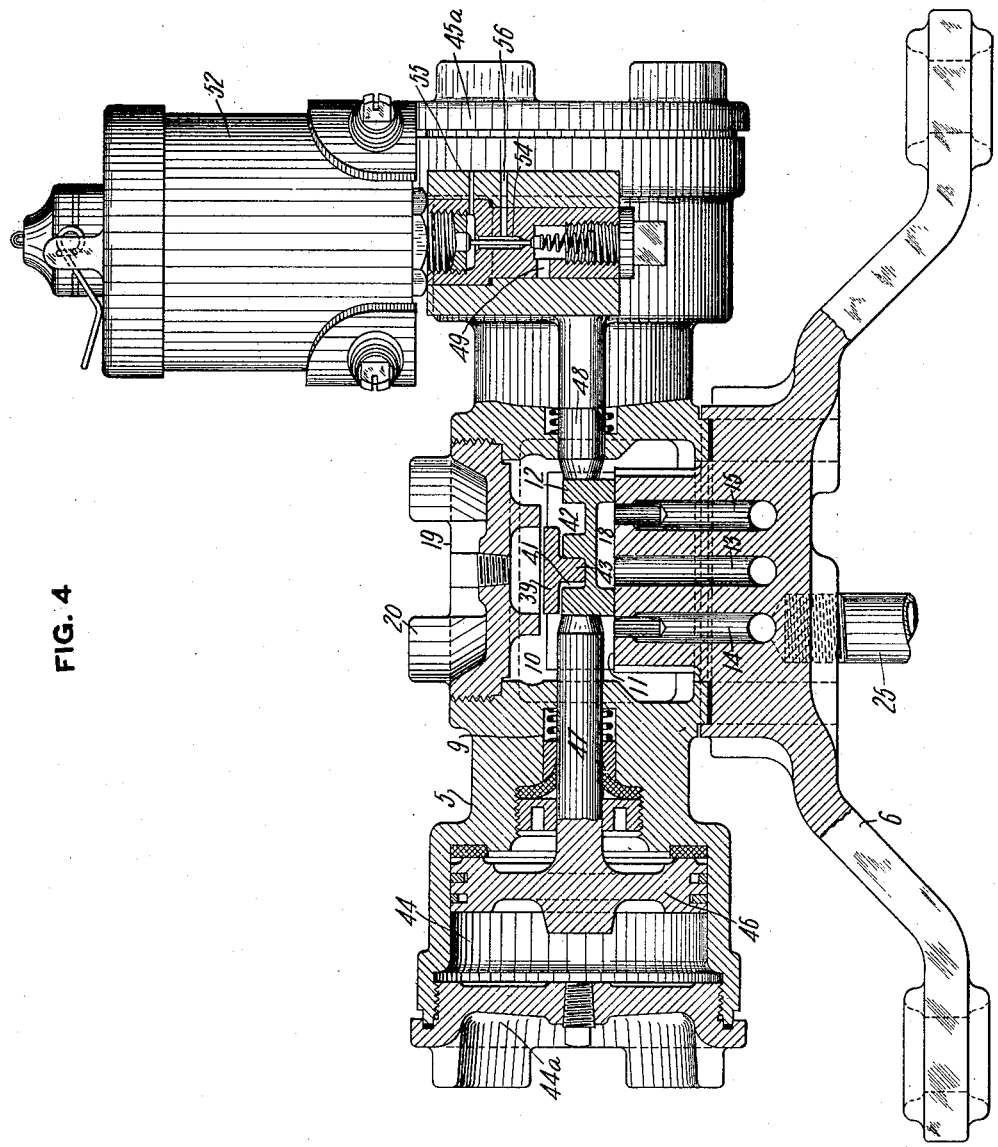
Figure 5:
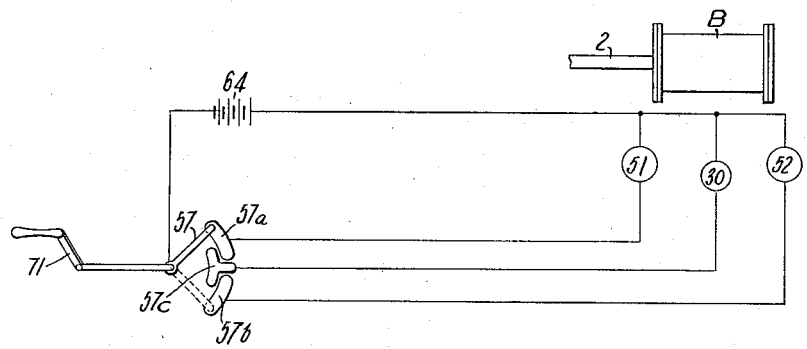
Figure 6:
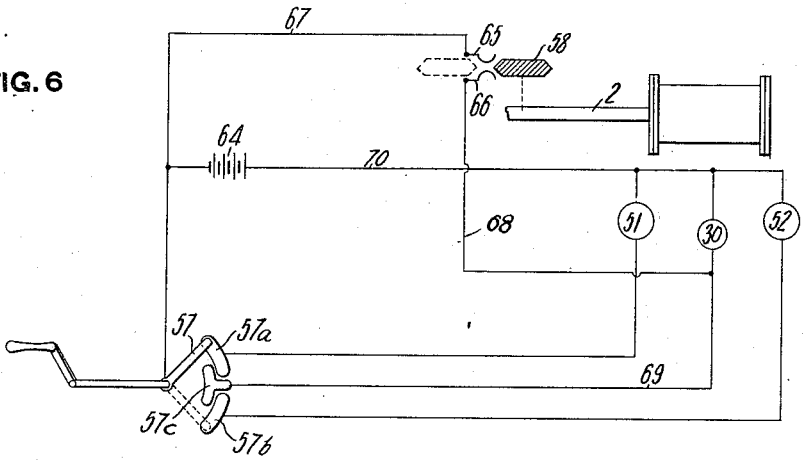

In the accompanying drawings, Figure 1 is a plan view showing a railway traffic controlling device having applied thereto one form of controlling apparatus embodying my invention. Fig. 2 is a top plan view, partly sectioned, showing on a larger scale a valve device C shown in Fig. 1. Fig. 3 is a sectional view on the line III—III of Fig. 2, looking in the direction of the arrows. Fig. 4 is a sectional view on the line IV—IV of Fig. 2 looking in the direction of the arrows. Figs. 5 and 6 are diagrammatic views showing two arrangements of circuits which may be used in connection with the apparatus shown in the preceding views.

Similar reference characters refer to similar parts in each of the views.

Referring first to Fig. 1, the reference character A designates a railway traffic controlling device, here shown as being a railway switch. This switch is operated by a fluid pressure motor B, which motor is controlled by an electromagnetically controlled valve device C. The electromagnets of the valve device C are controlled as usual by a suitable means such as by a lever of an "interlocking" machine, as hereinafter explained.

The motor B, as here shown, comprises a cylinder 61 and a piston 62 operable therein. The piston 62 is operatively connected with the rails of switch A through the medium of a usual form of switch mechanism comprising, as here shown, a bar 2 moved longitudinally by the piston, an alligator jaw 3 operated by a stud 63 on the bar 2, and a bar 4 operatively connected with the alligator jaw and also connected with the switch rails. Inclosed in a box 60 is a circuit controlling device operated by bar 2, which device, as usual, controls the "indication" circuits for the switch.

The valve device C is illustrated in detail in Figs. 2, 3 and 4. Referring now to these views, this valve device comprises a valve body 5 which is fixed to a bracket 6 by means of bolts 7. The bracket 6 is provided with feet having suitable holes by means of which it may be fixed to a base plate 8, as indicated in Fig. 1. It is understood, however, that if desired, the valve device C may be mounted directly on the cylinder 61 of the motor B.

The valve body 5 is provided with a chamber 10 in which is located a slide valve 12 adapted to slide in suitable guides on a valve face 11. The slide valve 12 is reciprocated by means hereinafter explained. The valve face 11 is provided with three ports 13, 14 and 15; port 13 opens to atmosphere, and ports 14 and 15 are connected respectively with the left hand and right hand ends of cylinder B, as viewed in Fig. 1, by pipes 16 and 17, respectively. The slide valve 12 is of the usual D-valve type provided with a recess 18; when the valve 12 is in one extreme position of its stroke (the position shown in Figs. 2 and 4), chamber 10 is connected with the left hand end of cylinder 61 by port 14 and pipe 16, and the right hand end of cylinder 61 is open to atmosphere through pipe 17, port 15, recess 18 and port 13; when the slide valve 12 is moved to its other extreme position, the left hand end of cylinder 61 will be open to atmosphere and the right hand end will be connected with chamber 10. Hence, it will be seen that when chamber 10 contains fluid pressure, one end or the other of cylinder B will be exposed to such pressure depending on the position of slide valve 12.

Chamber 10 is closed by a plug 19 adapted to be screwed into a threaded hole in the valve body 5. This plug 19 is provided with lugs 20 by means of which the plug may be screwed into and out of its hole.

The valve body 5 is provided with another chamber or recess 21 to which fluid pressure is constantly supplied by a pipe 25 from a suitable source, as indicated in Fig. 3.

Chamber 21 is connected with chamber 10 by a port 26, which port is provided with a valve 22. This valve 22 is biased to the closed position by a spring 23 and by the action of the fluid pressure in chamber 21 on the back of the valve, but it is provided with a stem 24 extending through the port 26 and into chamber 10 by means of which it may at times be opened as hereinafter explained. Chamber 21 is closed by a valve body 28 clamped to the body 5. This valve body 28 contains a double pin valve 29 of a usual construction controlled by an electromagnet 30. Valve 29 operates to connect a pipe 27 with atmosphere through an exhaust port 31 or with chamber 21 through a port 32, according as the valve is in one position or the other, that is, according as magnet 30 is deënergized or energized. The other end of pipe 27 opens into a cap 34 screwed onto the valve body 5, which cap closes a cylinder 33 formed in the body 5. The cylinder 33 contains a piston 35 provided with a centrally located tongue 35$^a$ which abuts against a smaller piston 38 adapted to reciprocate in a smaller cylinder 37 extending from cylinder 33 to chamber 10. The small piston 38 is operatively connected with a reciprocating plate 39 by means of a button 40 adapted to fit into a jaw formed in one end of plate 39. This plate 39 performs two functions, viz., to mechanically lock the slide valve 12 and to operate valve 22. I will now explain the construction by virtue of which the locking of the slide valve 12 by this plate is accomplished.

The upper surface of slide valve 12 is provided with two transverse grooves 41 and 42, and the lower surface of plate 39 is provided with a longitudinal tongue 43 adapted to slide into and out of either of these grooves. When the slide valve 12 occupies one or the other of its extreme positions, the tongue 43 may occupy one of the grooves 41 or 42 and will thereby lock the slide valve in such position, but when the plate 39 is moved longitudinally by the admission of fluid pressure behind piston 35 the tongue 43 moves out of the groove in the slide valve, so that the slide valve is then unlocked and may be moved to its other position.

When the plate 39 is moved longitudinally by the admission of fluid pressure behind piston 35, the end of this plate engages stem 24 and opens valve 22, thereby admitting fluid pressure from chamber 21 to chamber 10. This opening of valve 22 is accomplished before slide valve 12 is unlocked.

I will now explain the means by which the slide valve 12 is reciprocated. Formed in the ends of the valve body 5 are two cylinders 44 and 45, the outer ends of which are closed by caps 44$^a$ and 45$^a$, respectively. Located in these cylinders are pistons 46 and 53, which pistons are fixed respectively to piston rods 47 and 48 which extend through suitable stuffing boxes in the valve body 5 and abut against the ends of slide valve 12. Fluid pressure is supplied from chamber 21 to the outer end of cylinder 45 through passages 49 and 56, and this supply is controlled by a pin valve 54 which latter is controlled by an electromagnet 52. Fluid pressure is in a similar manner supplied to the outer end of cylinder 44 (the passages not being shown in the drawing) and this supply is similarly controlled by a pin valve (not shown) which is in turn controlled by an electromagnet 51. These pin valves are controlled by their electromagnets in the usual manner; that is, when the magnet is deënergized the outer end of the corresponding cylinder is open to atmosphere through an exhaust port 55, and when the magnet is energized the cylinder is disconnected from atmosphere and is connected with chamber 21.

The operation of the entire apparatus is as follows: Referring to Fig. 5, the electromagnets 30, 51 and 52 for motor B are provided with circuits which are controlled by a contact 57 operated by a lever 71 of an "interlocking machine." In Fig. 5 I have purposely omitted the indication apparatus and the contacts controlling such apparatus, in order to simplify the drawing, but it is understood that suitable indication apparatus would be employed, such for example as the apparatus shown and described in United States Patent No. 1101039, issued to Scattergood and Wallace on June 23, 1914. When the switch A occupies the position in which it is shown in Fig. 1 (which I will herein term the "normal" position) and the contact 57 occupies the corresponding end of its stroke in engagement with plate 57$^a$, as shown in full lines in Fig. 5, magnet 51 (the "normal" magnet) is energized from battery 64 and the other two magnets are deënergized. Cylinder 44 is, therefore, connected with chamber 21 so that pistons 46 and 53 and slide valve 12 occupy the position shown; slide valve 12 is mechanically locked by plate 39; and valve 22 is closed so that chamber 10 is disconnected from the source of fluid pressure; and consequently both ends of cylinder 61 are also disconnected from the source of fluid pressure.

When it is desired to move the switch A to its opposite position (which I will herein term the "reverse" position), the lever 71 is moved through a portion of its stroke until stopped by a "reverse indication latch," as shown in Patent No. 1,101.039 to Scattergood and Wallace, hereinbefore mentioned. Contact 57 then touches both plates 57$^c$ and 57$^b$. During this movement of the lever the circuit for magnet 30 (the "lock" magnet) is first closed through contact 57—57$^c$ and then the circuit for magnet 52 (the "reverse" magnet) is closed through contact 57—57ᵇ; also, the circuit for magnet 51 is opened. Magnet 30 continues to be energized until the lever is released by the indication device and moved to the end of its stroke. The energization of magnet 30 admits fluid pressure from chamber 21 to cylinder 33 through pipe 27, thereby causing movement of pistons 35 and 38 and plate 39. Plate 39 during this movement first opens valve 22 to admit fluid to chamber 10, and it then unlocks slide valve 12. The outer end of piston 35 and the inner end of piston 38 are now both exposed to the same pressure per unit area, but owing to the difference in the areas of these pistons they are held in the position to which they were moved by pressure on piston 35. Magnet 51 being deënergized, cylinder 44 is disconnected from chamber 21 and opened to atmosphere. The energization of magnet 52 causes the admission of fluid pressure to cylinder 45 so that the slide valve 12 is moved to the position opposite to that shown in the drawings. This causes the admission of fluid pressure to the right hand end of cylinder 61 as viewed in Fig. 1, and the switch A is then moved to the reverse position. When the movement of the switch is completed, the control lever of the interlocking machine is as usual released by the indication apparatus and its stroke may be completed. Contact 57 then moves to the position shown in dash lines in Fig. 6 so that it engages plate 57ᵇ only. During this latter portion of the stroke of the lever, the circuit for lock magnet 30 is opened at plate 57ᶜ, and this magnet then causes pipe 27 to be disconnected from chamber 21 and opened to atmosphere. The consequent reduction of pressure on piston 35 permits the pressure on piston 38 to move both of these pistons and the plate 39 back to the position in which they are shown in the drawings, thereby locking slide valve 12 and permitting valve 22 to close. The closure of valve 22 disconnects chamber 10, and therefore cylinder 61 from the source of fluid pressure.

The operation of the apparatus for movement of switch A from the reverse to the normal position is similar to the operation just explained.

It is sometimes desirable that means be provided for returning the switch A to the position corresponding to the position of its controlling lever 71 when the switch is moved from such position by means other than the operating motor. When so, an arrangement such as that shown in Fig. 6 may be employed. The apparatus and circuits shown in Fig. 6 are similar to those shown in Fig. 5, except that I have added a shunt connection for magnet 30 around the contact 57. This shunt connection is controlled by a contact 58 which is included in the circuit controller 60 operated by bar 2 of Fig. 1. Contact 58 is open while the switch A is in either extreme position, but is closed as long as the switch occupies any intermediate position. The operation of the apparatus shown in Fig. 6 under normal conditions is the same as the operation of the apparatus shown in Fig. 5. If, however, an attempt is made to move switch A away from the position corresponding to the position of lever 7 by sliding bar 2, the apparatus will operate as follows: As soon as bar 2 is moved a short distance (not sufficient to unlock switch A at stud 63), contact 58 will bridge across contact fingers 65 and 66, thereby closing the following circuit for lock magnet 30—from battery 64 through wire 67, contacts 65, 58, 66, wires 68 and 69, magnet 30, wire 70 to battery 64. Magnet 30 will then connect pipe 27 with chamber 21 so that piston 35 is caused to move plate 39 which latter opens valve 22, thereby connecting chamber 21 with chamber 10. Fluid pressure then flows from chamber 10 through port 14 and pipe 16 to the left end of cylinder 61 (as viewed in Fig. 1) and this fluid pressure acts on piston 62 to forcibly drive the bar 2 back to its initial position. It is obvious that other means may be provided to cause return of the switch A to the position corresponding to the position of its controlling lever in case it is moved out of such position by hand.

One feature of an apparatus embodying my invention is that the fluid pressure is shut off from the motor B immediately after this motor has performed its work of moving the switch. By means of this feature I effect a saving of the fluid pressure which would ordinarily leak out from the motor B if this motor were constantly subjected to the fluid pressure; under service conditions this leakage is considerable and is, therefore, of serious moment as affecting the cost of operation.

It will be observed that with the apparatus which I have shown and described, it is impossible to shut off the fluid supply from chamber 10 without effecting the mechanical locking of slide valve 12 against shifting from the position which it occupies, and conversely it is impossible to unlock the slide valve without first having admitted fluid to the chamber 10. It will be further observed that the action of the locking plate 39 is dependent upon positive fluid pressure in both directions.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a railway traffic controlling device, a cylinder, a piston movable in the cylinder and operatively connected with said device, a source of fluid pressure, a valve chamber, a valve movable in said chamber, and adapted to connect the chamber with said cylinder on one side of the piston or the other; means for locking said valve, means for moving said valve; and means for first connecting said chamber with said source of pressure and then operating said valve-locking means to unlock the valve when the valve is to be moved, and for operating said valve-locking means to lock the valve and disconnecting the chamber from said source after the piston has moved in response to the movement of the valve.

2. In combination, a railway traffic controlling device, a fluid pressure motor for operating said device in reverse directions, a source of fluid pressure, a valve chamber, a slide valve movable in said chamber and adapted to connect the chamber with said motor to cause operation of the latter in one direction or the other, a second valve biased to the closed position and adapted when opened to connect said chamber with said source of pressure, a mechanical lock adapted to lock said slide valve in either of its extreme positions, said lock when moved to its unlocking position being effective to open said second valve, a differential piston device for the control of said lock, the smaller face of the differential piston device being exposed to the pressure in said chamber, means for exposing the larger face of said differential piston device to the source of fluid pressure or to atmosphere whereby said differential piston device is actuated to unlock or lock the mechanical lock and thereby to open the second valve or permit the second valve to close, and means for moving the slide valve.

3. In combination, a railway traffic controlling device, a fluid pressure motor for operating said device, a source of fluid pressure, means for connecting said source with the motor to cause movement of the traffic controlling device and for disconnecting the source from the motor when the movement of the device is completed, a lever for controlling said means, and means for connecting said source with the motor to return the latter to its initial position corresponding to the position of the control lever in case the motor is moved away from such position by means other than fluid pressure.

4. In combination, a railway traffic controlling device, a fluid pressure motor for operating said device, a valve for controlling said motor, means for operating said valve, a source of fluid pressure, and means for connecting said source of pressure with and disconnecting it from said valve and for mechanically locking said valve.

5. In combination, a railway traffic controlling device, a fluid pressure motor for operating said device, a source of fluid pressure, a valve for controlling the supply of fluid pressure from said source to said motor, a lever, and means controlled by said lever for locking and unlocking said valve and for causing movements of said valve and for disconnecting said source from said valve when the valve is locked.

6. In combination, a railway traffic controlling device, a fluid pressure motor for operating said device, a source of fluid pressure, a controlling lever, a valve controlled by said lever for governing the supply of fluid pressure to said motor, and means also controlled by said lever for locking and unlocking said valve and for disconnecting said source from said valve when the valve is locked.

7. In combination, a railway traffic controlling device, a fluid pressure motor for operating said device, a source of fluid pressure, a controlling lever, a valve controlled by said lever for governing the supply of fluid pressure to said motor, means also controlled by said lever for locking said valve when the traffic controlling device is in either extreme position, and means controlled by said valve locking means for preventing the flow of fluid from said source to said valve when the valve is locked and for permitting such flow under all other conditions.

8. In combination, a railway traffic controlling device, a fluid pressure motor for operating said device, a source of fluid pressure, a controlling lever, a valve controlled by said lever for governing the supply of fluid pressure to said motor, said valve having two extreme positions corresponding to the extreme positions of the traffic controlling device, a mechanical lock controlled also by said lever for restraining movement of the valve from either extreme position, and means controlled by said lock for disconnecting said source from said valve when the valve is locked.

9. In combination, a railway traffic controlling device, a lever having two controlling positions, a valve for controlling said traffic controlling device, means for causing said valve to coincide in its two effective positions with those of said lever, means for locking the valve in either extreme position when the lever and the traffic controlling device coincide in position, and means for preventing the flow of fluid from said source to said valve when the valve is locked.

10. In combination, a railway traffic controlling device, a fluid pressure motor for operating said device, a source of fluid pressure, a valve for controlling the supply of fluid pressure from said source to said motor, a lever for controlling said valve, a lock controlled also by said lever for preventing movements of said valve, and a second valve controlled by said lock and interposed between said source and the first-mentioned valve said second valve being closed when the lock is in locking position.

11. In combination, a railway traffic controlling device, a fluid pressure motor for operating said device, a source of fluid pressure, a controlling lever, a valve controlled by said lever for governing the supply of fluid pressure to said motor, a lock also controlled by said lever for locking and releasing said valve, and means controlled by the traffic controlling device for releasing said lock when said device occupies certain predetermined positions regardless of the position of the controlling lever.

12. In combination, a railway traffic controlling device, a fluid pressure motor for operating said device, a source of fluid pressure, a controlling lever, a valve controlled by said lever for governing the supply of fluid pressure to said motor, and a second valve controlled also by said lever and interposed between said source and said first mentioned valve.

13. In combination, a railway traffic controlling device, a fluid pressure motor for operating said device, a source of fluid pressure, a controlling lever, a valve controlled by said lever for governing the supply of fluid pressure to said motor, a second valve controlled also by said lever and interposed between said source and said first mentioned valve, and means controlled by said traffic controlling device for opening said second valve when said device occupies certain predetermined positions regardless of the position of controlling lever.

14. In combination, a railway traffic controlling device, a fluid pressure motor for operating said device, a source of fluid pressure, a controlling lever, a valve controlled by said lever for governing the supply of fluid pressure to said motor, and means operated by fluid from said source and controlled by said lever for locking and releasing said valve.

15. In combination, a railway traffic controlling device, a fluid pressure motor for operating said device, a source of fluid pressure, a controlling lever, a valve controlled by said lever for governing the supply of fluid pressure to said motor, and means operated by fluid from said source and controlled by said lever for connecting said source with and disconnecting it from said valve.

In testimony whereof I affix my signature in presence of two witnesses.

JOHN P. COLEMAN.

Witnesses:
P. MTUE,
A. HERMAN WEGNER.

Copies of this patent may be obtained for five cents each, by addressing the "Commissioner of Patents, Washington, D. C."